ic Cl. H01b 7/02
United States Patent Office 3,459,871
Patented Aug. 5, 1969

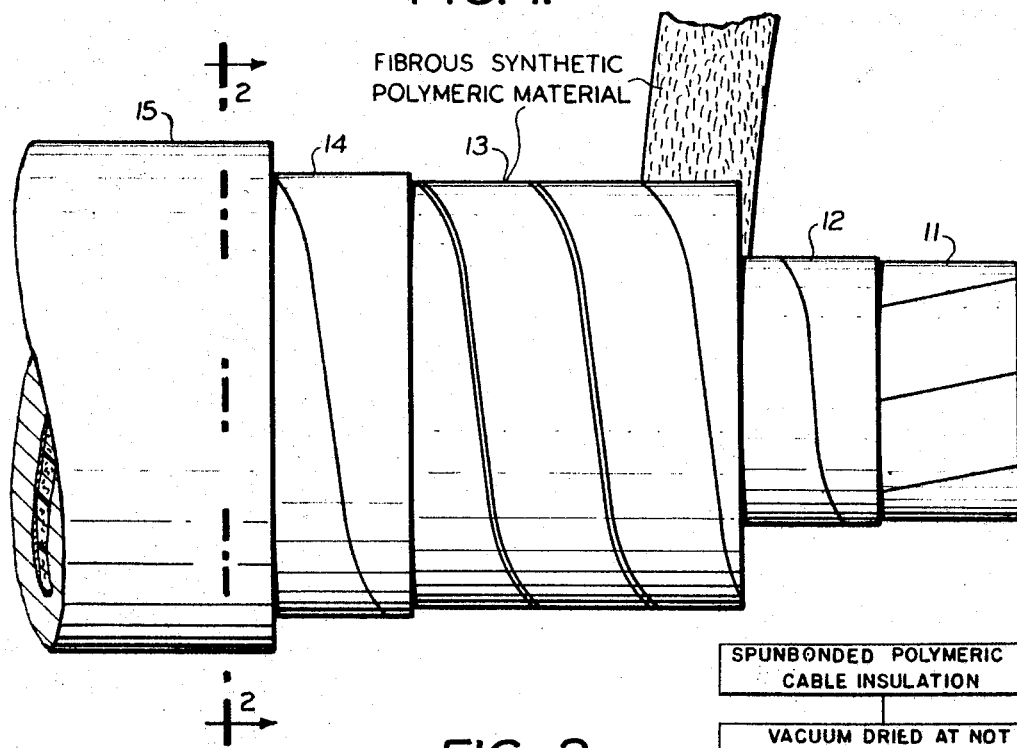
FIG. 1.
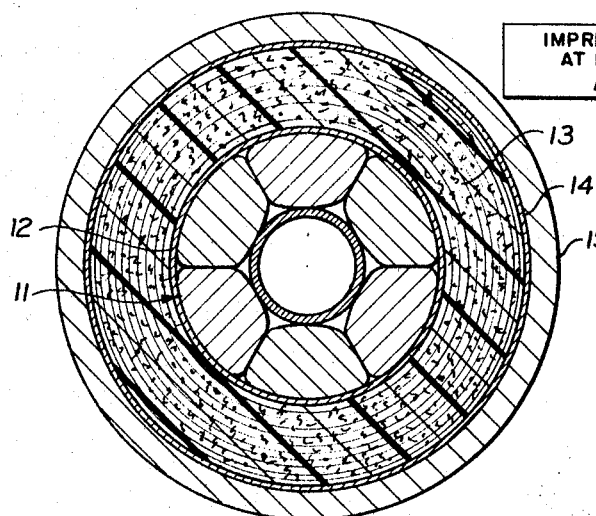
FIG. 2.
```
SPUNBONDED POLYMERIC
   CABLE INSULATION
          ↓
  VACUUM DRIED AT NOT
  IN EXCESS OF ABOUT
          50° C
          ↓
  IMPREGNATED WITH OIL
   AT NOT IN EXCESS OF
       ABOUT 50° C
```
FIG. 3
INVENTORS
GEORGE S. EAGER, JR.
JULIUS A. SZILARD
BY
ATTORNEYS.

3,459,871
HIGH VOLTAGE CABLE
George S. Eager, Jr., Upper Montclair, and Julius A. Szilard, Westfield, N.J., assignors to General Cable Corporation, New York, N.Y., a corporation of New Jersey
Filed Oct. 21, 1966, Ser. No. 588,565
Int. Cl. H01b 7/02
U.S. Cl. 174—25                                6 Claims

ABSTRACT OF THE DISCLOSURE

Insulated electric power cable for transmitting power at extremely high voltages with very low energy dissipation in the insulation. The conductor insulation is an oil-impregnated wall of overlying helical wrappings of fibrous tapes comprising randomly arranged, highly dispersed, continuous filament fibers of synthetic polymeric material, specifically high density polyethylene, bonded primarily at filament crossovers, the tapes having air resistance comparable to that of low density cellulosic papers currently used for high voltage cable insulation. Also disclosed is a method of evacuating and impregnating such insulation with oil at a temperature not exceeding about 50° C.

---

This invention relates to high voltage electric power cable having a metallic conductor which is surrounded by a wall of wrapped insulation impregnated with a high grade insulating oil and filled with insulating oil or an inert gas such as nitrogen. The preferred form of the invention provides an improved oil-impregnated and oil-filled electric power cable capable of operating at extremely high voltages with an extremely low amount of energy dissipated in the cable insulation. An alternate form suitable for operation at somewhat lower, but still very high, voltages is filled with nitrogen gas and also exhibits extremely low energy loss.

Oil-impregnated cellulosic paper in common use as cable insulation has a dissipation factor in the range of about 0.25% to 0.50% and an average dielectric constant of about 3.7. Oil-impregnated cellulosic paper insulation having dissipation factors as low as 0.15% and a dielectric constant of about 3.4 has been produced. Based on present knowledge, further substantial improvement of these properties for oil-impregnated cellulosic paper insulation seems unlikely.

As cable operating voltage increases, low dielectric loss becomes increasingly important. Dielectric loss is a direct function of dielectric constant, dissipation factor and the square of the voltage. The effect of high dielectric loss on a cable system is to reduce the amount of power which can be transmitted. Since the dielectric constant for a given type of insulation is essentially the same at all voltages, we may for the moment consider only the other two factors as influencing dielectric loss. Thus, with a given dissipation factor, the dielectric loss at 230 kv. is 2.77 times as great as at 138 kv. ((230/138)²=2.77); at 345 kv. it is 6.25 times as great as at 138 kv.; and at 500 kv. it is 13.1 times as great as at 138 kv. These ratios are for cables of the same dimensions. Actually, more insulation will be used as the voltage increases, with corresponding decrease in capacitance, so that comparative losses at higher voltages will not be as great as indicated, but will still be greater by very large factors.

Oil-impregnated cellulosic paper insulated cables operating at voltages as high as 345 kv. are in commercial operation. Field tests have indicated that such cables can be made for operation at voltages at high as perhaps 400 kv. Above this voltage, however, it is questionable whether the energy lost in the insulation can be kept sufficiently low to satisfy utility operating engineers. At voltages above 500 kv., say at 750 kv., this energy loss for the cellulosic paper insulation certainly is excessive.

In order to reduce this energy loss it has been suggested in the past to use insulating materials other than cellulosic fiber base paper. For example, it has been suggested to use synthetic polymers, a number of which possess electrical and mechanical properties apparently suitable for extremely high voltage cables. These synthetic polymers are usually available in the form of films of about 3 to 10 mils in thickness.

When synthetic polymer films are applied to a conductor as overlying helical wrappings to form a thick wall, say 750 to 1000 mils thick, it is impossible to impregnate the wall by procedures used for impregnating fibrous tape insulating walls of similar thickness. The films in question may be made by extrusion or coating from solutions from resins such as polyethylenes, polycarbonates, polyesters and others. These films are homogeneous or isotropic structures, in contrast to cellulose based paper which is built up of fibers matted together. The insulating oil used in the present high voltage cellulose paper base power cables impregnates and completely permeates the fibrous paper tapes and coats the individual fibers. The high dielectric strength of the present high voltage paper-oil cables is due to the subdivision of the oil into extremely thin layers formed between the cellulose fibers and between the layers of paper tapes. This subdivision of the oil into extremely thin layers obviously cannot be obtained by the use of non-porous plastic films wrapped tightly one over the other. The films are somewhat stretchy and during the wrapping operation pull down into the butt-spaces of an underlying layer.

To overcome this problem a number of modifications have been suggested. For one, it has been suggested that the surfaces of the synthetic polymer films be roughened or embossed so as to provide channels through which the impregnant can move between wrapped layers. For another, it has been suggested to make composite tapes in which a synthetic polymer film is laminated with a cellulosic paper, or between two cellulosic papers, the relatively porous cellulosic papers functioning to provide the necessary channels through which the impregnant can move. For still another, it has been suggested that alternate tapes of cellulosic paper and synthetic polymer films be supplied, to function much the same as the second suggestion.

All of these suggestions have disadvantages in that they are costly and that in two cases the cable insulation still contains the relatively high loss cellulose material. To overcome these objections, the present invention uses a fibrous paper-like structure in the form of tape made of high density polyethylene. This material may be thought of as a porous polymeric paper having an air resistance which is comparable to that of low density cellulose papers currently used for high voltage cable insulation.

It is an object of this invention to provide oil-filled or gas-filled electric cables suitable for operation at extremely high voltages with sufficiently low dielectric loss to make the use of such cables economically feasible. It is a further object of the invention to overcome the objections to use of overlying wrappings of synthetic polymer tapes in high voltage electric cables by replacing the polymer films heretofore used with fibrous paper-like polymer tapes having an air resistance of the order of that of cellulose paper. Still another object of the invention is to provide a high voltage electric cable in which the insulation comprises a cellulose-free wall of overlying helically wrapped layers of fibrous paper-like tape made of high density polyethylene. Another object is to provide a method of impregnating such cable. Further objects and advantages of the invention will be described or will become apparent as the description proceeds.

The accompanying drawings show for illustrative purposes one cable embodying the present invention. FIG. 1 is an elevation of a short length of the illustrative cable, the elements of the cable being cut back progressively greater distances to disclose the construction; FIG. 2 is a cross-section through the cable of FIG. 1, substantially on the line 2—2; and FIG. 3 is a flow sheet for the impregnating method.

The cable conductor 11 may be of any suitable construction. For purposes of illustration a hollow segmental conductor is shown. Each of the six segments may be stranded in conventional manner. Conductor shielding preferably will be applied, as shown at 12. Overlying the shielded conductor is an insulating wall 13 comprising many overlying helical wrappings of fibrous tapes each comprising a web of randomly arranged, highly dispersed, continuous filament fibers of synthetic polymeric material, the fibers being bonded primarily at filament crossovers. The tape thickness may be similar to that of cellulose paper insulating tape and the thickness of this insulating wall will be determined by the voltage for which the cable is designed. In FIG. 1 the outer insulating tape is shown partially unwrapped merely for purposes of illustration. Over the insulation wall is applied the insulation shielding 14. The outer sheath 15 may be of any suitable construction, for example lead, or if the cable is to be drawn into a pipe which will be filled with oil or gas under pressure the outer sheath applied at the factory may be a temporary sheath to be stripped from the cable as it is pulled into a pipe line. It will be understood that the details of the construction of the conductor, the shielding layers and the sheath may vary widely.

The Du Pont Company produces a sheet material with a fibrous paper-like structure made from high density polyethylene. This material is described by Du Pont as "Spunbonded," where the word is used as an adjective and is defined as "a descriptive term for fibrous structures manufactured from continuous synthetic polymeric filamentary materials in an integrated spinning and bonding process."

The material used in the experiments which will be described here is designated by Du Pont as "Type 822 Series R." This material weighs 2.0 oz./sq. yd. and has a thickness of 6.5 mils. The fiber diameters are comparable to cellulose paper fibers, i.e., they are in the micron range. On the other hand, the spunbonded polyethylene paper consists of long, practically continuous fibers in contrast to the short cellulose paper fibers. The fibers are spun and bonded together primarily at filament crossovers so as to produce a tape which has most of the mechanical properties of cellulosic paper and behaves much like the latter.

This spunbonded paper is made of essentially linear polyethylene and has a softening point of about 110°–125° C. To increase the resistance of this tape to high temperature it may be chemically or electro-magnetically cross-linked. Chemical cross-linking may be accomplished by treatment with a suitable organic peroxide. Electro-magnetic cross-linking may be accomplished by subjecting the tape to electro-magnetic radiation. In either case the resistance to heat may be raised by an increase in the softening point from about 110°–125° C. to about 150° C.

Another means of effectively strengthening this polyethylene paper in the presence of heat would be to laminate it with a thin sheet of cellulosic paper which, having greater dimensional stability in the presence of heat and oil, would effectively reinforce the polyethylene paper. A cable made up of such a laminated tape construction, while not quite as good electrically as a cable insulated exclusively with the polyethylene paper, still is an improvement over other forms of laminates previously suggested because of the lower loss factor and the very suitable air resistance.

Table I gives important electrical and mechanical properties of cellulosic paper which is in commercial use on high voltage cables, of spunbonded polyethylene paper, and of other types of synthetic polymer papers, and composite paper polymer films. The loss factor of the spunbonded paper is extremely low and much less than the other types. At the same time, the air resistance of this material is suitable for high voltage cable applications. The extremely low air resistance of the polyethylene terephthalate paper makes it unsuitable for high voltage cable and the dielectric strength is low. The paperlike structures of polyethylene terephthalate and polyacrylonitrile are made with coarser fibers which are poorly matted in comparison to the well matted micron sized fibers comprising the cellulose paper and the spunbonded polyethylene paper. The low air resistance and the low dielectric strength of the oil-impregnated polyethylene terephthalate and the polyacrylonitrile papers apparently are due to these two factors—coarse fibers and lack of proper matting. The fact that the air resistance of the cellulosic paper/polypropylene film is infinity makes it quite unsatisfactory as compared to spunbonded paper, because this means that the oil impregnant cannot pass through the paper radially, but must pass longitudinally between the layers and radially only through the butt-spaces.

TABLE I.—IMPORTANT ELECTRICAL AND MECHANICAL PROPERTIES OF CELLULOSIC AND SYNTHETIC POLYMER PAPERS

| Property | Cellulosic paper | Spunbonded polyethylene paper | Polyethylene terephthalate paper | Polyacrylonitrile paper | Polyethylene encapsulated cellulose fiber paper | Cellulose paper polypropylene film composite paper |
|---|---|---|---|---|---|---|
| Dielectric constant, 100° C | 3.50 | 2.20 | 2.30 | 3.45 | 2.53 | 2.87 |
| Power factor, percent, 100° C | 0.27 | 0.05 | 0.26 | 5.60 | 7.97 | 0.17 |
| Loss factor, percent, 100° C | 0.95 | 0.11 | 0.60 | 19.3 | 20.3 | 0.49 |
| Air resistance, gurley seconds | 1090 | 145 | 0 | 11.5 | Infinity | Infinity |
| Modulus of elasticity in tension p.s.i.×10⁻⁶ | 6.5 | 0.55 | 37 | | | 12 |
| Gurley stiffness corrected to 5 mils | 375 | 44.8 | 150 | 108 | 453 | 150 |

Above data taken on papers impregnated with a high grade insulating oil.

The great advantages of spunbonded polyethylene paper over the other types are apparent from Table I. It possesses by far the lowest loss factor and at the same time has reasonable mechanical properties such as air resistance and stiffness. The higher air resistance of this tape is explained by the micron size fiber diameter and the better matting as compared to all other types of papers measured made with synthetic polymers, of which polyethylene terephthalate and polyacrylontrile are only two examples.

In the manufacture of conventional oil-impregnated paper power cable, the drying of the paper prior to oil impregnation is carried out in a vacuum and preferably at temperatures above 100° C. This is required because cellulosic paper contains anywhere from 1 to 6% moisture, depending on the humidity conditions prevailing at the time the cable is processed. In contrast the spunbonded polyethylene paper is insensitive to moisture and contains less than 0.1% moisture. In view of this fact a shorter drying time and lower drying temperatures are adequate to remove any surface moisture which may be present on the surface of the spunbonded polyethylene paper insulated cable. Vacuum drying followed by oil impregnation at 50° C. is sufficient. Processing at this much lower than conventional temperature reduces likelihood of swelling of the polyethylene.

Cables made with spunbonded polyethylene tape have been found to possess excellent mechanical properties in handling, such as bending. They possess extremely low loss factor making them suitable for operation in the range of 500–700 kv., and perhaps higher. Properties of these cables are given in Table II.

TABLE II.—PROPERTIES OF CABLE MADE WITH CELLULOSIC AND SYNTHETIC FIBER PAPERS

| Property | Conventional Cable with cellulosic paper | Improved Cable with Cellulosic paper | Cable with Spunbonded Polyethylene paper |
|---|---|---|---|
| Dielectric constant 100° C | 3.40 | 3.30 | 2.20 |
| Power factor, percent at 100° C | 0.28 | 0.16 | 0.04 |
| Loss factor, percent at 100° C | 0.95 | 0.53 | 0.09 |

The low loss factor obtained using the spunbonded polyethylene paper is immediately apparent. This value is obtained because the power factor as well as the dielectric constant of the spunbonded polyethylene paper are both lower than even the improved grade of cellulosic paper used in the manufacture of cable rated at 345 kv.

This invention may be variously modified and embodied within the scope of the subjoined claims.

We claim:
1. A high voltage electric power cable comprising a conductor insulated with a plurality of layers of overlying helical wrappings of fibrous tapes each comprising a web of randomly arranged, highly dispersed, continuous filament fibers of synthetic polymeric material spun and bonded together primarily at filament crossovers, insulating oil impregnating the wrapped insulation, an impervious sheath enclosing the insulated conductor, and a body of insulating fluid under pressure filling the sheath.

2. A high voltage electric power cable according to claim 1 in which the synthetic polymeric fibers are polyethylene fibers.

3. A high voltage electric power cable according to claim 1 in which the synthetic polymeric fibers are high density polyethylene fibers.

4. A high voltage electric power cable according to claim 1 in which the fibrous tapes are composed of essentially linear polyethylene fibers.

5. A high voltage electric power cable according to claim 1 in which the fibrous tapes are spunbonded tapes of polyethylene fibers.

6. The method of impregnating with oil a high voltage electric power cable comprising a conductor insulated with overlying helical wrappings of fibrous tapes comprising webs of randomly arranged, highly dispersed, continuous filament fibers of synthetic polymeric material spun and bonded together primarily at filament crossovers, which comprises vacuum drying the insulated conductor at a temperature not exceeding about 50° C. and impregnating the insulation with oil at a similar temperature.

References Cited

UNITED STATES PATENTS

| | | | |
|---|---|---|---|
| 3,376,378 | 4/1968 | Bullock | 174—110 |
| 3,013,912 | 12/1961 | Priaroggia et al. | 174—25 X |
| 3,032,464 | 5/1962 | Grieve | 174—25 X |
| 3,077,510 | 2/1963 | Olds | 174—25 |
| 3,223,773 | 12/1965 | Priaroggia | 174—25 |

FOREIGN PATENTS 206,017 2/1957 Australia.

LEWIS H. MYERS, Primary Examiner

A. T. GRIMLEY, Assistant Examiner

U.S. Cl. X.R.

174—26, 110, 120